(12) United States Patent
Yagi

(10) Patent No.: US 8,199,633 B2
(45) Date of Patent: Jun. 12, 2012

(54) BASE STATION AND WIRELESS COMMUNICATION METHOD

(75) Inventor: Masahiro Yagi, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 409 days.

(21) Appl. No.: 12/473,200

(22) Filed: May 27, 2009

(65) Prior Publication Data

US 2009/0296649 A1 Dec. 3, 2009

(30) Foreign Application Priority Data

May 27, 2008 (JP) ............................... P2008-138472
May 27, 2008 (JP) ............................... P2008-138473

(51) Int. Cl.
*H04J 11/00* (2006.01)
*H04W 4/00* (2006.01)

(52) U.S. Cl. ......... 370/208; 370/328; 370/329; 370/330

(58) Field of Classification Search ........................ None
See application file for complete search history.

(56) References Cited

U.S. PATENT DOCUMENTS

| | | | | |
|---|---|---|---|---|
| 7,948,935 | B2* | 5/2011 | Yamada et al. ............... | 370/328 |
| 2006/0031362 | A1* | 2/2006 | Chacko et al. ................ | 709/206 |
| 2006/0045001 | A1 | 3/2006 | Jalali | |
| 2006/0176093 | A1* | 8/2006 | Song et al. .................... | 327/179 |
| 2007/0053456 | A1* | 3/2007 | Kim .............................. | 375/260 |
| 2007/0183308 | A1* | 8/2007 | Korobkov et al. ............ | 370/208 |
| 2007/0213069 | A1* | 9/2007 | Ji et al. .......................... | 455/450 |
| 2007/0281702 | A1* | 12/2007 | Lim et al. ...................... | 455/442 |
| 2007/0287465 | A1* | 12/2007 | Hyon et al. ................... | 455/450 |
| 2008/0056205 | A1 | 3/2008 | Nagai | |
| 2008/0076438 | A1* | 3/2008 | Chang et al. ................. | 455/452.2 |
| 2008/0117867 | A1* | 5/2008 | Yin et al. ....................... | 370/329 |
| 2008/0310362 | A1* | 12/2008 | McBeath et al. .............. | 370/330 |
| 2009/0258628 | A1* | 10/2009 | Lindoff et al. ................ | 455/302 |
| 2009/0296628 | A1* | 12/2009 | Karabinis ...................... | 370/319 |
| 2009/0303949 | A1 | 12/2009 | Tanigawa et al. | |
| 2010/0020754 | A1 | 1/2010 | Tanigawa et al. | |
| 2010/0067458 | A1 | 3/2010 | Tanigawa et al. | |
| 2010/0111037 | A1 | 5/2010 | Tanigawa et al. | |

FOREIGN PATENT DOCUMENTS

| | | |
|---|---|---|
| JP | 2004-207983 | 7/2004 |
| JP | 2005-341415 | 12/2005 |
| JP | 2006-515141 | 5/2006 |
| JP | 2008-060743 | 3/2008 |
| JP | 2008-072275 | 3/2008 |
| JP | 2008-079269 | 4/2008 |
| JP | 2008-113090 | 5/2008 |
| WO | WO-2006/026344 | 3/2006 |

OTHER PUBLICATIONS

Office Action from Japanese Patent Application No. 2008-138473, mailed on Jul. 13, 2010.
Association of Radio Industries and Businesses, OFDMA / TDMA TDD Broadband Wireless Access System (Next Generation PHS), ARIB Standard, ARIB STD-T95 Version 1.2, Mar. 18, 2009.
Japanese Office Action from Japanese Patent Application No. 2008-138472, mailed on Apr. 13, 2010.

* cited by examiner

*Primary Examiner* — Andrew Lee
(74) *Attorney, Agent, or Firm* — Morrison & Foerster LLP

(57) ABSTRACT

A base station is provided. The base station conducts wireless communication with one or more terminal devices using an OFDMA system, and has: a channel assigning unit that assigns PRU an extra channel used for data communication and an anchor channel including a map indicating the position of PRU to which the extra channel is assigned, wherein the channel assigning unit assigns the anchor channel to PRU of a predetermined frequency domain and assigns the extra channel to PRU of a domain other than the predetermined frequency domain.

12 Claims, 9 Drawing Sheets

BASE STATION AND WIRELESS COMMUNICATION METHOD

CROSS REFERENCE TO RELATED APPLICATION

The present application claims priority from Japanese Patent Application No. 2008-138472, which was filed on May 27, 2008, and from Japanese Patent Application No. 2008-138473, which was filed on May 27, 2008, the disclosures of which are herein incorporated by reference in their entirety.

TECHNICAL FIELD

The present invention relates to a base station and a wireless communication method which are capable of conducting wireless communications using an OFDMA system.

BACKGROUND

In recent years, terminal devices represented by a PHS (Personal Handy phone System), a mobile telephone and the like have become popular, allowing users to make calls and obtain information anywhere and anytime. In particular, lately, as the amount of available information has shown a steady growth, high-speed and high quality wireless communication systems have been introduced to enable downloading a mass of data.

In such wireless communications, there is a need to duplex signal for transmission/reception. The duplexing of systems may typically include TDD (Time Division Duplex) for switching transmission/receipt by means of time division and FDD (Frequency Division Duplex) for duplexing transmission/receipt using different frequencies. In addition, multiple access systems which allow simultaneous communication with a plurality of terminal devices may typically include TDMA (Time Division Multiple Access) for switching a plurality of terminal devices by means of time division, FDMA (Frequency Division Multiple Access) for dividing a frequency band, and CDMA (Code Division Multiple Access) for multiplying different signs of respective terminal devices.

For example, the next generation PHS communication standards for high-speed digital communication may include ARIB (Association of Radio Industries and Business) STD T95 (Non-Patent Document 1) and PHS MoU (Memorandum of Understanding), which have employed OFDMA/TDMA TDD Broadband Wireless Access System (next generation PHS system).

OFDMA (Orthogonal Frequency Division Multiple Access) refers to multiple access in OFDM (Orthogonal Frequency Division Multiplexing). OFDM is an advanced version of FDM (Frequency Division Multiple), which is a system using a frequency band effectively by dividing a carrier signal into a plurality of sub carriers on a frequency axis and making phases of signal waves orthogonal between adjacent sub carriers to partially overlap bands of the sub carriers. While one terminal device occupies all sub carriers in OFDM, OFDMA forms sub channels by grouping a plurality (e.g., 24) of sub carriers and allows multiple access by sharing all the sub channels between a plurality of terminal devices. For example, a sub channel divides a frequency band of 18 MHz into 20 sub frequency bands.

In the meantime, the next generation PHS system allows multiple access by TDMA in addition to OFDMA. TDMA is a system which divides a frequency into a plurality of time slots on a time axis and conduct communication with a plurality of parties. In the present conditions, it is assumed to divide an up link (from a terminal device to a base station) and a down link (from a base station to a terminal device) into four sub links respectively. That is, in the next generation PHS system, both the frequency axis and the time axis can be sub-divided into communication blocks which are dynamically assigned to a plurality of terminal devices, thereby allowing efficient communication. A communication block defined by one time slot in one sub channel is referred to as PRU (Physical Resource Unit) and it is assumed to use 80 PRUs in the vicinity of one base station. Also, a communication block defined by one time slot in one sub channel is referred to as PRU (Physical Resource Unit) and it is assumed to use 36 to 40 PRUs per one base station.

While a base station can use 20 sub channels, as described above, one of these sub channels is used as a control channel (CCH) and the remaining sub channels are dynamically assigned to terminal devices (Dynamic Channel Assign (DCA)). An anchor channel or an extra channel is assigned to PRU included in a sub channel used for communication. The anchor channel is assigned by one to each terminal device and includes a map of PRU to which an extra channel for the terminal device is assigned. The extra channel is a channel which actually includes data and a plurality of extra channels are assigned to one terminal device depending on the amount of data and communication situation. Notification of the assignment of extra channels by a map included in the anchor channel in the same manner is called "FM-mode" (Fast access channel based on Map-Mode).

The anchor channel is assigned to the PRU having the best communication quality found when the carrier sense is performed for all PRUs. Although the extra channel basically does not perform carrier sense, if a PRU in which no communication is conducted is newly used by their base station, the extra channel is assigned to the PRU after carrier sense is performed. In this manner, since a base station can dynamically change the position and number of extra channels through the anchor channel, it is possible to transmit/receive a mass of data at high speed.

However, a PRU in the OFDMA system has a problem in that it is likely to be interfered with adjacent PRUs. Many techniques have been proposed for avoiding such interference with wireless communications. For example, Patent Document 1 discloses a technique in which a down link frame is divided into similar sized resource blocks, transmission data is scheduled from the beginning of the respective resource blocks, and data beyond the capacity of the resource blocks is scheduled to be transmitted at the end of the resource blocks assigned to other sectors. This technique states that it is possible to prevent communication from being continuously conducted in a co-channel sector and reduce co-channel interference.

Also, a PRU in the OFDMA system has a problem in that it is likely to be interfered with adjacent PRUs in a frequency direction. Many techniques have been proposed for avoiding such interference with wireless communications. For example, Patent Document 1 discloses a technique in which a down link frame is divided into similar sized resource blocks, transmission data are scheduled from the beginning of the respective resource blocks, and data having capacity beyond the resource blocks are scheduled to be transmitted at the end of the resource blocks assigned to other sectors. This technique states that it is possible to prevent communication from being conducted with delay in a co-channel sector and reduce co-channel interference.

[Patent Document 1] JP-T-2006-515141 (the "JP-T" as used herein means a published Japanese translation of a PCT patent application)

[Non-Patent Document 1] ARIB (Association of Radio Industries and Business) STD-T95

SUMMARY

As described above, the OFDMA/TDMA TDD systems can conduct communication using more additional terminal devices (users) and more communication blocks (PRU) than the above described TDMA-TDD. However, since respective terminal devices may have different communication situations and different distances from a base station and accordingly have different modulation schemes, power and delay, interference between adjacent PRUs may occur. For the delay, the interference may be effectively prevented by a guide band in TDMA. However, in OFDMA, since frequency bands of sub carriers overlap, a PRU can be affected by an electric wave of adjacent PRUs if PRUs are greatly different in modulation scheme or power.

If an error due to any interference is detected in an extra channel, the extra channel can be compensated by making a re-transmission request such as an ARQ (Automatic Repeat reQuest) or a HARQ (Hybrid-Automatic Repeat reQuest). However, since an anchor channel includes information (map) on the number and position of extra channels, if the anchor channel can not be used due to interference by other PRUs, communication itself is impossible.

On the other hand, as described previously, the anchor channel performs assignment by performing carrier sense and the position of the PRU of the anchor channel is not changed until communication is cut. Therefore, although the presence of interference with the predetermined PRU at the point of time when the carrier sense is performed may be determined, the presence of interference with the predetermined PRU at a frame timing after the next time can not be determined. Accordingly, even if communication situations of PRU to which an anchor channel is assigned deteriorate during communication, it is not possible to cope with such deterioration.

For example, since an extra channel is dynamically assigned, there are some cases where an extra channel of a different terminal device is assigned to PRU adjacent to an anchor channel (particularly in a frequency axis direction) after the anchor channel is assigned based on the result of a carrier sense. In particular, when the extra channel uses a high power modulation system (for example, 256 QAM (Quadrature Amplitude Modulation)), the anchor channel is interfered by the extra channel of other terminal devices, so that it is likely that communication is not conducted.

In consideration of the above problems, it is an object of the invention to provide a base station and a wireless communication method, which are capable of conducting stable communication, with interference by an anchor channel restricted to the minimum, by deliberating the position of the PRUs to which an anchor channel and an extra channel used by one terminal device are assigned.

Also, it is an another object of the invention to provide a base station and a wireless communication method, which are capable of conducting stable communication, with interference with an anchor channel restricted to the minimum, by deliberating position of PRUs to which an extra channel used by one terminal device is assigned.

According to a first aspect of the present invention, there is provided a base station that conducts wireless communication with one or more terminal devices using an OFDMA system, comprising: a channel assigning unit that assigns PRU an extra channel used for data communication and an anchor channel including a map indicating the position of PRU to which the extra channel is assigned, wherein the channel assigning unit assigns the anchor channel to PRU of a predetermined frequency domain and assigns the extra channel to PRU of a domain other than the predetermined frequency domain.

With the above configuration, since only the anchor channel is assigned to the PRU of the predetermined frequency domain, it is possible to distinguish with certainty the frequency domain of the PRU to which the anchor channel is assigned from the frequency domain of PRU to which the extra channel is assigned. Accordingly, since an extra channel of a different terminal device is not assigned to the PRU adjacent to the anchor channel after the anchor channel is assigned, it is possible to prevent interference by the extra channel with the anchor channel. This allows an improvement in communication stability.

According to a second aspect of the present invention, the predetermined frequency domain is adjacent to a frequency domain to which a control channel is assigned.

Since the control channel is intermittently transmitted, the control channel does not conduct communication between the control channel transmission and the next control channel transmission. Accordingly, the PRU to which the control channel is assigned has low interference with adjacent PRUs. Accordingly, with the above configuration, interference with the anchor channel can be reduced, which results in improvement to communication stability.

According to a third aspect of the present invention, the predetermined frequency domain is biased to the highest or lowest one of the frequencies used by the base station.

If the predetermined frequency domain is set to be a middle domain of the frequencies used by the base station, the PRU to which the anchor channel is assigned is likely to be interfered by the extra channels assigned to the PRUs of frequencies higher and lower than the predetermined frequency domain of the PRU. On the contrary, with the above configuration, the number of PRUs adjacent to the PRU to which the anchor channel is assigned can be reduced to half of the number of PRUs in cases where the predetermined frequency domain is set to be the middle domain of frequencies, thereby reducing interference of adjacent extra channels with the anchor channel.

According to a fourth aspect of the present invention, there is provided a wireless communication method using one or more terminal devices and a base station using an OFDMA system, wherein, when the base station assigns PRU an extra channel used for data communication and an anchor channel including a map indicating the position of PRU to which the extra channel is assigned, the base station assigns the anchor channel to PRU of a predetermined frequency domain and assigns the extra channel to PRU of a domain other than the predetermined frequency domain to which the anchor channel is assigned.

Components corresponding to the technical idea in the above-described base station and explanation thereof can be applicable to the wireless communication method.

According to a fifth aspect of the present invention, there is provided a base station that conducts wireless communication with one or more terminal devices using an OFDMA system, comprising: a channel assigning unit that assigns PRU an extra channel used for data communication and an anchor channel including a map indicating a position of PRU to which the extra channel is assigned, wherein the channel assigning unit assigns the extra channel, which is used by the terminal device to which the anchor channel is assigned, to a different PRU of the same time slot as the PRU to which the anchor channel is assigned.

With the above configuration, the extra channel of the terminal device using the anchor channel is assigned to PRU of the time slot to which anchor channel is assigned. Accordingly, extra channels of other terminal devices are not assigned to PRU of the time slot to which the anchor channel is assigned. Accordingly, it is possible to prevent interference from the extra channels of other terminal devices with the anchor channel, thereby allowing stable communication.

According to a sixth aspect of the present invention, if the channel assigning unit assigns a plurality of anchor channels to the PRU of the same time slot, the channel assigning unit assigns the extra channel, which is used by the terminal device to which one anchor channel is assigned, to PRU adjacent in a frequency direction of the one anchor channel.

Since the anchor channel is assigned based on a result of carrier sense, there is a case where a plurality of anchor channels is assigned to the same time slot. In this case, if an extra channel of the terminal device using the anchor channel is assigned to PRU adjacent in a frequency direction of the anchor channel, it is possible to suppress interference from extra channels of other terminal devices.

According to a seventh aspect of the present invention, there is provided a base station that conducts wireless communication with one or more terminal devices using an OFDMA system, comprising: a channel assigning unit that assigns PRU an extra channel used for data communication and an anchor channel including a map indicating a position of PRU to which the extra channel is assigned, wherein the channel assigning unit assigns the extra channel used by one terminal device to PRU of one time slot.

With the configuration where an extra channel using one terminal device is assigned to PRU of one time slot, since communication can be conducted by time division for each terminal device and a beam forming by adaptive array antennas can appropriately direct to the terminal device, it is possible to obtain an effect of the adaptive array antennas to the maximum.

According to an eighth aspect of the present invention, the channel assigning unit assigns the extra channel to PRU of the same time slot as the anchor channel which is used by the terminal device to which the extra channel is assigned.

Since the anchor channel is assigned based on a result of carrier sense, there is a case where a plurality of anchor channels are assigned to the same time slot. In this case, if an extra channel of the terminal device using the anchor channel is assigned to PRU adjacent in a frequency direction of the anchor channel, it is possible to suppress interference from extra channels of other terminal devices.

According to a ninth aspect of the present invention, the channel assigning unit assigns the anchor channel to PRU of a different time slot for each terminal device.

With the configuration where anchor channels are assigned to different time slots for each terminal device, extra channels are assigned to different time slots for each terminal device. Accordingly, one time slot is used by one terminal device and thus it is possible to suppress interference from extra channels of other terminal devices with the anchor channel.

In addition, since communication can be conducted by time division for each terminal device, it is possible to obtain an effect of the adaptive array antennas to the maximum.

According to a tenth aspect of the present invention, the channel assigning unit assigns the anchor channel to PRU adjacent to or near a control channel.

Since the control channel is intermittently used, there is a case where PRU to which the control channel is assigned does not conduct communication. Accordingly, since PRU adjacent to or near the control channel has low interference, by assigning an anchor channel to the PRU, it is possible to avoid discontinuity of communication due to interference with the anchor channel.

According to an eleventh aspect of the present invention, the base station further comprises an adaptive array antenna.

According to twelfth aspect of the present invention, there is provided a wireless communication method using one or more terminal devices and a base station using an OFDMA system, wherein, when the base station assigns PRU an extra channel used for data communication and an anchor channel including a map indicating a position of PRU to which the extra channel is assigned, the base station assigns the extra channel, which is used by the terminal device to which the anchor channel is assigned, to a different PRU of the same time slot as the PRU to which the anchor channel is assigned.

Components corresponding to the technical idea in the above-described base station and explanation thereof can be applicable to the wireless communication method.

According to the base station and the wireless communication method of the invention, stable communication can be conducted, with interference with an anchor channel restricted to the minimum, by deliberating the position of PRUs to which an anchor channel and an extra channel used by one terminal device are assigned.

In the above-described base station of the invention, stable communication can be conducted, with interference with an anchor channel restricted to the minimum, by deliberating position of PRUs to which an extra channel used by one terminal device is assigned.

BRIEF DESCRIPTION OF THE DRAWINGS

Illustrative aspects of the invention will be described in detail with reference to the following figures wherein.

DETAILED DESCRIPTION OF EXEMPLARY EMBODIMENTS OF THE PRESENT INVENTION

First Exemplary Embodiment

Figure 1:
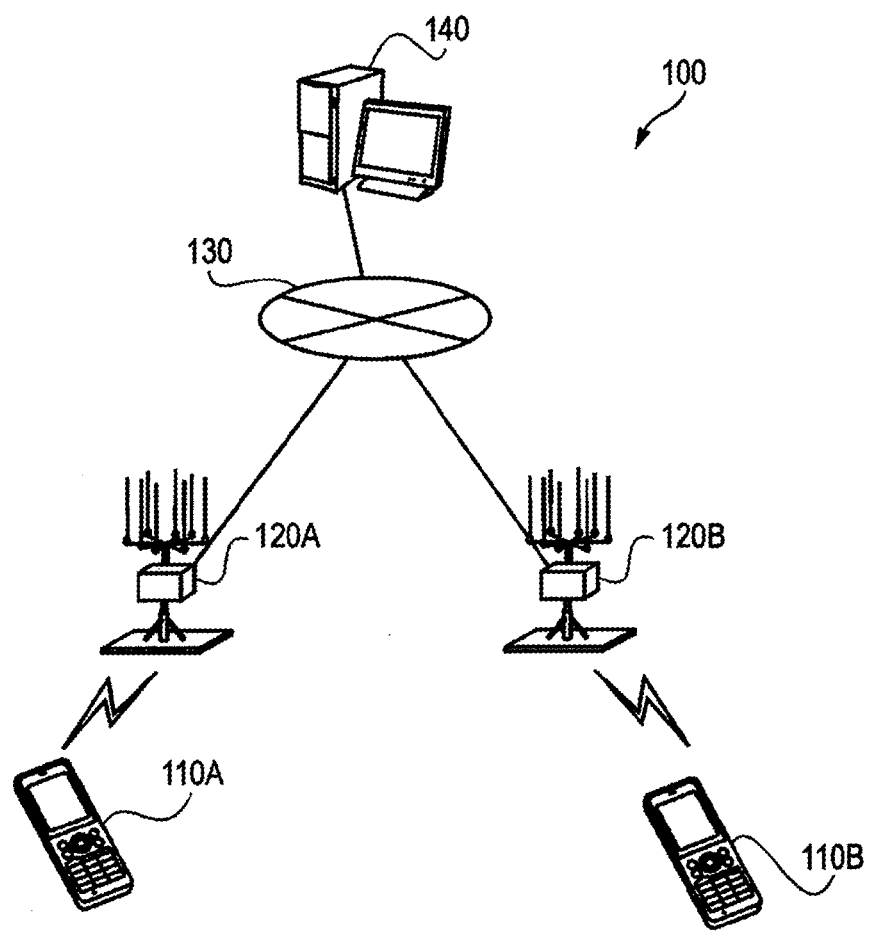
FIG. 1 is a schematic view showing a connection relation between components included in a wireless communication system.

Hereinafter, a first exemplary embodiment of the present invention will be described with reference to the accompanying drawings. In this embodiment, dimensions, material, specified numerical values and so on are only an example given for the purpose of facilitating a thorough understanding of the present invention and are not intended to limit the present invention unless otherwise stated. In the specification and the drawings, components having the same or similar functions and configurations are denoted by the same reference numerals, and therefore, repeated explanation of which is omitted and further components having no direct relation with the present invention are not shown.

A wireless communication system is constructed by terminal devices, which may be represented by PHS terminals, mobile telephones and the like, and wireless communication apparatuses (base stations) which are fixedly arranged with certain intervals and conduct communication with the terminal devices. In the first exemplary embodiment, the entire wireless communication system is described to facilitate an understanding of the present invention, and thereafter detailed configuration of base stations as wireless communication apparatuses and PHS terminals as terminal devices is described. In addition, in the first exemplary embodiment, although terminal devices are illustrated with PHS terminals, the terminal devices are not limited thereto but may be any other wireless communication electronic devices, including mobile telephones, note-type personal computers, PDAs (Personal Digital Assistants), digital cameras, music players, car navigators, portable televisions, game devices, DVD players, remote controller, etc.

(Wireless Communication System 100)

FIG. 1 is a schematic view showing the connection relation between components included in a wireless communication system. Wireless communication system 100 includes PHS terminals 110 (110A and 110B), base stations 120 (120A and 120B), a communication network 130 including an ISDN (Integrated Service Digital Network), Internet, a private line and the like, and a relay server 140.

In the wireless communication system 100, when a user makes an access from his/her PHS terminal 110A to the other PHS terminal 110B through a communication line, the PHS terminal 110A makes a request for wireless access to the base station 120A which lies within coverage. Upon receiving the request for wireless access, the base station 120A makes a request for communication access to a communication counterpart to the relay server 140 through the communication network 130. Then, the relay server 140 selects, for example, the base station 120B, which lies within the coverage of the other PHS terminal 110B, by referring to the position registration information of the PHS terminal 110B, thereby securing a communication path between the base station 120A and the base station 120B to establish communication between the PHS terminal 110A and the PHS terminal 110B.

In such a wireless communication system 100, various techniques have been employed for improving communication speed and communication quality of the PHS terminals 110 and the base stations 120. In the first exemplary embodiment, for example, the next generation PHS communication technique such as ARIB STD T95 or PHS MoU is employed and wireless communication based on an OFDMA/TDMA-TDD system is conducted between the PHS terminals 110 and the base stations 120. In this embodiment, improvement of communication stability is planned by assigning an anchor channel, which transmits control information such as MCS (Modulation and Coding Scheme), a communication channel map, error information and the like in such wireless communications, to a PRU of a predetermined frequency domain. Hereinafter, detailed configuration of the base stations 120 in such a wireless communication system 100 will be described.

(Base Station 120)

Figure 2:
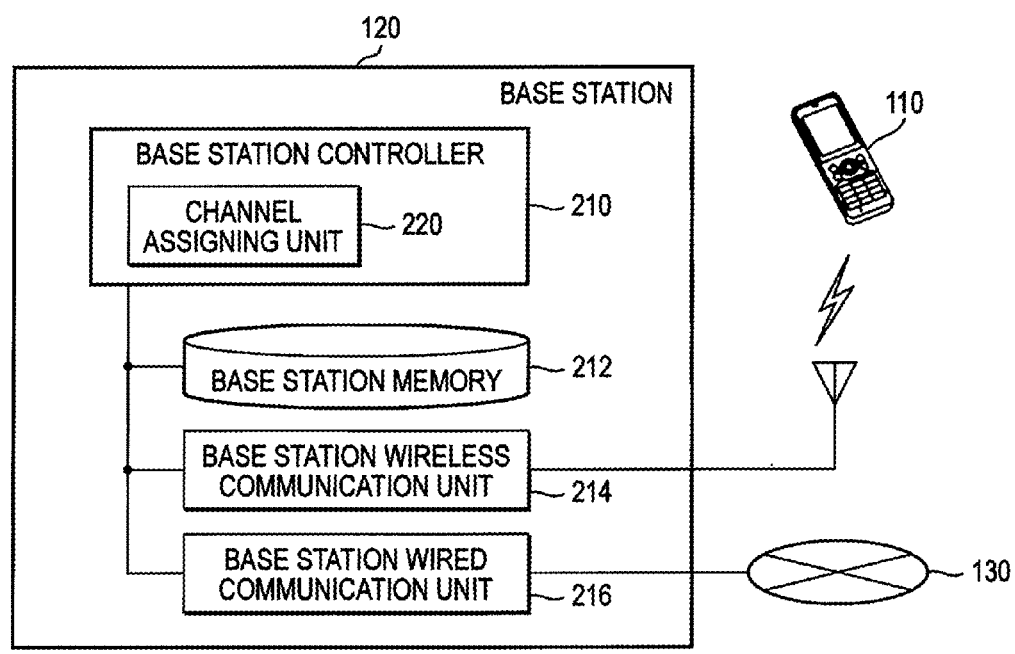
FIG. 2 is a block diagram showing a general configuration of a base station.

FIG. 2 is a block diagram showing a general configuration of a base station. A base station 120 includes a base station controller 210, a base station memory 212, a base station wireless communication unit 214 and a base station wired communication unit 216.

The base station controller 210 manages and controls the base station 120 as a whole by means of a semiconductor integrated circuit including a central processing unit (CPU). In addition, the base station controller 210 controls a communication access to the communication network 130 of the PHS terminal 110 or other PHS terminals 110 using a program of the base station memory 212.

The base station memory 212 is constituted by ROM, RAM, EEPROM, non-volatile RAM, flash memory, HDD or the like, and stores programs processed in the base station controller 210, time information, etc.

The base station wireless communication unit 214 establishes communication with the PHS terminal 110 and exchanges data with the PHS terminal 110. In addition, the unit 214 may determine the optimal MCS for conducting communication with high efficiency in correspondence to quality of communication with the PHS terminal 110 and request the PHS terminal 110 to provide the MCS through an anchor channel 180.

The base station wired communication unit 216 may access various servers including the relay server 140 through the communication network 130.

In addition, in this embodiment, the base station controller 210 also acts as a channel assigning unit 220. As described earlier, in the OFDMA/TDMA-TDD system, both of a frequency axis and a time axis are sub-divided into communication blocks which are dynamically assigned to a plurality of terminal devices, thereby allowing efficient communication. A communication block defined by one time slot in one sub channel is referred to as PRU (Physical Resource Unit).

The channel assigning unit 220 assigns an extra channel (hereinafter referred to as EXCH) and an anchor channel (hereinafter referred to as ANCH) to PRU. ANCH is assigned by one to each terminal device and includes a map of PRU to which EXCH for the terminal device is assigned. EXCH is a channel containing data actually and a plurality of EXCHs is assigned to one terminal device depending on the amount of data and communication situations.

For the assignment of PRU, the channel assigning unit 220 assigns ANCH to PRU of a predetermined frequency domain and assigns EXCH to PRU of a domain other than the predetermined frequency domain to which ANCH is assigned. This allows the frequency domain of PRU to which ANCH is assigned to be certainly distinguished from the frequency domain of PRU to which EXCH is assigned. Accordingly, after ANCH is assigned to PRU, since EXCH of the other PHS terminal 110 is not assigned to PRU adjacent to the ANCH, it is possible to prevent ANCH from being interfered with EXCH.

Figure 3A:
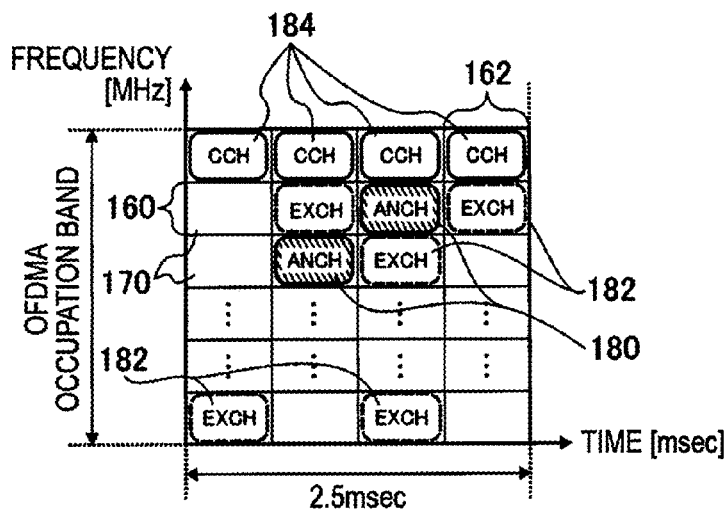
FIGS. 3A and 3B are views for explaining a frame structure of data transmitted/received in wireless communication using an OFDMA system.
Figure 3B:
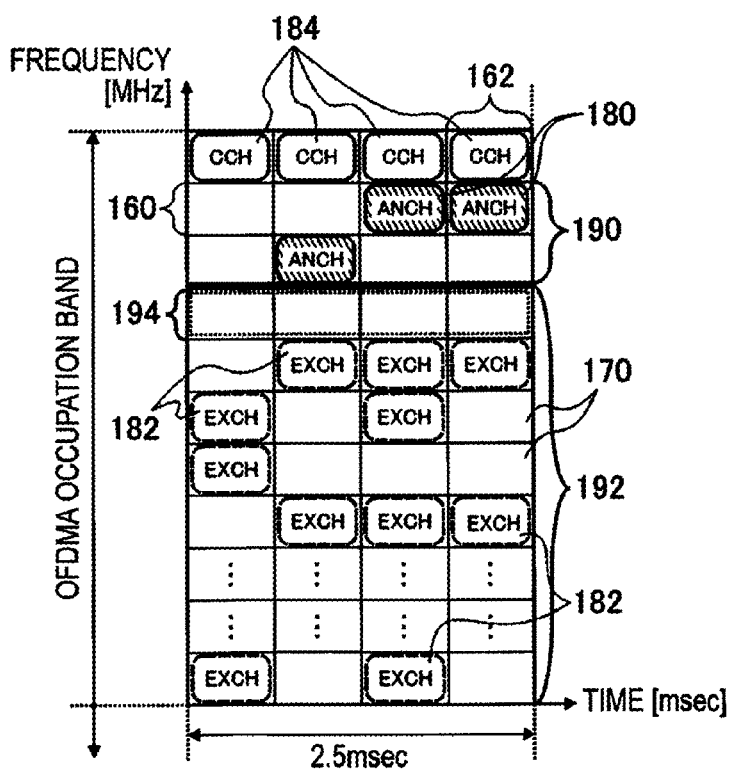

FIGS. 3A and 3B are a view for explaining a frame structure of data transmitted/received in wireless communication using an OFDMA system, FIG. 3A showing a frame structure by conventional PRU assignment and FIG. 3B showing a frame structure of PRU assignment according to this embodiment. In OFDMA (or OFDM), a map two-dimensionalized in time axis and frequency axis directions is provided, a plurality of sub channels 160 is arranged in the frequency axis direction with a constant base band distance, and PRU 170 is disposed for each time slot (TDMA slot) 162 in each sub channel 160.

For example, if an effective frequency band of a carrier of OFDM is 18 MHz, the carrier is divided into 480 sub carriers, and 24 sub carriers are grouped to form one sub channel 160, 20 sub channels 160 are composed of one carrier and an occupation band of one sub channel 160 becomes 900 kHz. In addition, for example, if one time slot is 5 msec and is divided into an up link and a down link by TDD, each of the up and down links has 2.5 msec. In addition, since TDMA divides 2.5 msec into 4 portions, one time slot 162 becomes 625 μsec.

Accordingly, PRU 170 is defined by an occupation band of 900 kHz according to the base band distance and the duration of 625 μsec by time division. In addition, a frame used for communication with a particular PHS terminal 110 is composed of ANCH 180 related to a control signal and EXCH 182 which stores data.

ANCH 180 is a control signal of FM-Mode and includes, for example, MI (Mcs Indicator), MR (Mcs Requirement), an ACK field and a map. Here, MI represents an MCS identifier of MCS when data is modulated. MR represents MCS requirement of data transmitted to itself. From a temporal standpoint, MI represents MCS used for modulation of data transmitted at the same time with a corresponding MCS identifier, and MR represents MCS desired after the next time. The ACK field represents a result of error detection of demodulated data. The map exists in only a frame of transmission from the base station 120 to the PHS terminal 110 and represents assignment of EXCH 182.

ANCH 180 is individually assigned for each PHS terminal 110 and occupies one PRU 170. With this ANCH 180, PRU 170 having high communication quality is assigned based on the result of carrier sense of the base station 120. Here, the carrier sense is performed based on SINR (Signal to Interference and Noise Ratio) or bit error rate in PRU 170 of a frame exchanging data with the PHS terminal 110.

EXCH 182 is PRU 170 assigned for each user as a communication path in FM-Mode, and may be assigned in plural to one PHS terminal 110, as shown by a dashed line in FIG. 3. With this EXCH 182, PRU 170 is assigned based on a result of carrier sense to determine whether or not PRU 170 is being used by other users. A result of the assignment is shown in a map of ANCH 180, as described above.

In addition, in FIG. 3, a control channel 184 (CCH: Control Channel, referred to as CCH) is assigned to PRU 170 of the highest frequency domain of frequencies used by the base station 120. This CCH 184 is intermittently transmitted from the base station 120, and the PHS terminal 110 may recognize an identifier (CSID) and received signal strength indicator (RSSI) of the base station 120 as a candidate for communication by receiving CCH 184. In addition, in this embodiment, although CCH 184 is assigned to PRU 170 having the highest frequency domain, without being limited thereto, it may be assigned to PRU 170 having other frequency domains.

In conventional assignment of PRU 170 to ANCH 180 and EXCH 182, based on a result of carrier sense of the base station 120, ANCH 180 was assigned to PRU 170 having high communication quality and EXCH 182 was assigned to PRU 170 not used by other users. As a result, PRU 170 assigned with EXCH 182 was adjacent to PRU 170 assigned with ANCH 180, as shown in FIG. 3A. If this EXCH 182 uses a high power modulation system (for example, 256 QAM), ANCH 180 is interfered with EXCH 182, which results in deterioration of communication quality.

To overcome the above-mentioned problem, in this embodiment, the channel assigning unit 220 assigns ANCH 180 to PRU 170 of a predetermined frequency domain 190 and assigns EXCH 182 to PRU 170 of a frequency domain 192 other than the predetermined frequency domain to which ANCH 180 is assigned, as shown in FIG. 3B.

In this manner, by distinguishing the frequency domain of PRU 170 to which ANCH 180 is assigned from the frequency domain of PRU 170 to which EXCH 182 is assigned, only ANCH 180 is assigned to PRU 170 of the predetermined frequency domain 190 and assignment of EXCH 182 to PRU 170 adjacent to ANCH 180 after ANCH 180 is assigned can be avoided. Accordingly, interference of EXCH 182 with ANCH 180 can be reduced, which may result in improvement of communication stability.

The predetermined frequency domain 190 of PRU 170 to which ANCH 180 is assigned may be preferably adjacent to the frequency domain to which CCH 184 is assigned, and more preferably biased to the highest or lowest one of frequencies used by the base station 120.

Since CCH 184 is intermittently transmitted, there are some cases where no communication is conducted. Accordingly, since PRU 170 to which CCH 184 is assigned has low interference with adjacent PRU 170, by assigning ANCH 180 to such PRU 170, it is possible to reduce interference with PRU 170 to which ANCH 180 is assigned.

In addition, by biasing the predetermined frequency domain 190 to the highest or lowest one of frequencies used by the base station 120, it is possible to reduce the number of PRUs 170 adjacent to the predetermined frequency domain 190. Accordingly, it is possible to reduce interference of the adjacent PRUs 170 with PRU 170 to which ANCH 180 is assigned.

Additionally, a blank domain 194 to which neither ANCH 180 nor EXCH 182 is assigned may be provided adjacent to the predetermined frequency domain 190 to which ANCH 180 is assigned. While communication quality of ANCH 180 is deteriorated when ANCH 180 is adjacent to EXCH 182 in a frequency axis direction, although assignment of ANCH 180 is limited to the predetermined frequency domain 190, ANCH 180 becomes adjacent to EXCH 182 at a boundary therebetween. However, by providing the blank domain 194 as described above, it is possible to additionally certainly separate ANCH 180 from EXCH 182, which results in extreme reduction of interference.

In addition, in this embodiment, although two sub channels 160 are arranged in the predetermined frequency domain 190 for assignment of ANCH 180, without being limited thereto, the number of arranged sub channels 160 may be optional. For example, in the case of installing the base station 120 in a lightly populated region, the number of arranged sub channels 160 is set to 1. Thus, the number of sub channels 160 arranged in a domain 192 other than the predetermined frequency domain may increase and accordingly the number of PRUs 170 to which EXCH 182 is assigned may also increase. Accordingly, it is possible to increase a communication speed of the PHS terminal 110 and the base station 120. In addition, for example, for a base station 120 installed in a location having frequent accesses, such as a busy street, by increasing the number of sub channels 160 assigned to the predetermined frequency domain 190, it is possible to conduct stable communication with little disconnection of ANCH 180 while increasing the number of simultaneous accesses.

In addition, a band (the number of sub channels 160) assigned to the predetermined frequency domain 190 may be semi-fixedly set as a parameter for each base station 120. In addition, the number of sub channels may be changed through remote control or may be dynamically changed depending on the number of accesses of terminals.

In the above-described wireless communication system 100, the frequency domain of PRU 170 to which ANCH 180 is assigned is distinguished from the frequency domain of PRU 170 to which EXCH 182 is assigned, and the base station 120 assigns ANCH 180 to PRU 170 of the predetermined frequency domain 190 and assigns EXCH 182 to PRU 170 of the domain 192 other than the predetermined frequency domain to which ANCH 180 is assigned. Thus, it is possible to reduce interference of EXCH 182 with ANCH 180, which results in improvement of communication stability. Next, a wireless communication method of conducting wireless communication using the above-described base station 120 will be described.

(Wireless Communication Method)

Figure 4:
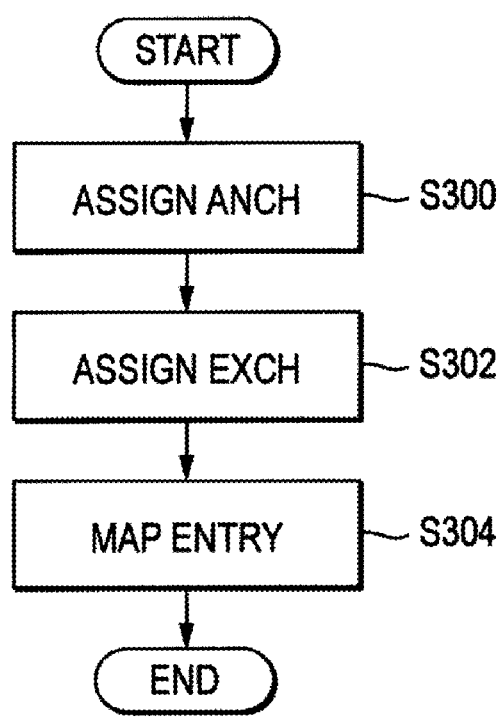
FIG. 4 is a flow chart showing a flow of process in a wireless communication method according to a first exemplary embodiment of the invention.

FIG. 4 is a flow chart showing a flow of process in a wireless communication method according to this embodiment. The base station 120 performs carrier sense for PRU 170 adjacent to CCH 184, that is, PRU 170 of the predetermined frequency domain 190, and assigns ANCH 180 to PRU 170 having low interference and high communication quality (S300: ANCH assignment step). Next, the base station 120 performs carrier sense for PRU 170 of the domain 192 other than the predetermined frequency domain, determines whether or not PRU 170 is used by other users, and assigns EXCH 182 to PRU 170 not used by the other users (S302: EXCH assignment step).

Subsequently, the position and number of PRUs 170 of EXCH 182 are entered as assignment information into a map of ANCH 180 and are sent to each terminal device (PHS terminal 110) (S304: map entry step). The PHS terminal 110 reads ANCH 180 and conducts communication by acquiring EXCH 182 according to the map included in the read ANCH 180. Then, since interference with ANCH 180 is extremely reduced, stable communication can be conducted.

While the first exemplary embodiment of the invention have been described with reference to the accompanying drawings, it goes without saying that the present invention is not limited to this embodiment. It is apparent to those skilled in the art that various modifications and changes can be made without departing from the spirit and scope of the invention set forth in the claims and it should be understood that such modifications and changes are included in the technical scope of the invention.

Steps in the wireless communication method of this disclosure are not necessarily be performed in an order described in the shown flow chart, but may be performed in parallel or by a sub routine.

The present invention is applicable for a base station and a wireless communication method which are capable of conducting wireless communications using an OFDMA system.

Second Exemplary Embodiment

Hereinafter, a second exemplary embodiment of the present invention will be described in detail with reference to the accompanying drawings. In this embodiment, dimensions, material, other specified numerical values and so on are only an example given for the purpose of facilitating a thorough understanding of the present invention and are not intended to limit the present invention unless otherwise stated. In the specification and the drawings, components having the same or similar functions and configurations are denoted by the same reference numerals, and therefore, repeated explanation of which is omitted and further components having no direct relation with the present invention are not shown.

A wireless communication system is constructed by terminal devices, which may be represented by PHS terminals, mobile telephones and the like, and base stations which are fixedly arranged with certain intervals and conduct wireless communication with the terminal devices. In the following description, the entire wireless communication system is first described, and thereafter detailed configuration of base stations is described. In addition, in this embodiment, although terminal devices are illustrated with PHS terminals, the terminal devices are not limited thereto but may be any other wireless communication electronic devices, including mobile telephones, note-type personal computers, PDAs (Personal Digital Assistants), digital cameras, music players, car navigators, portable televisions, game devices, DVD players, remote controllers, etc.

(Wireless Communication System 1000)

Figure 5:
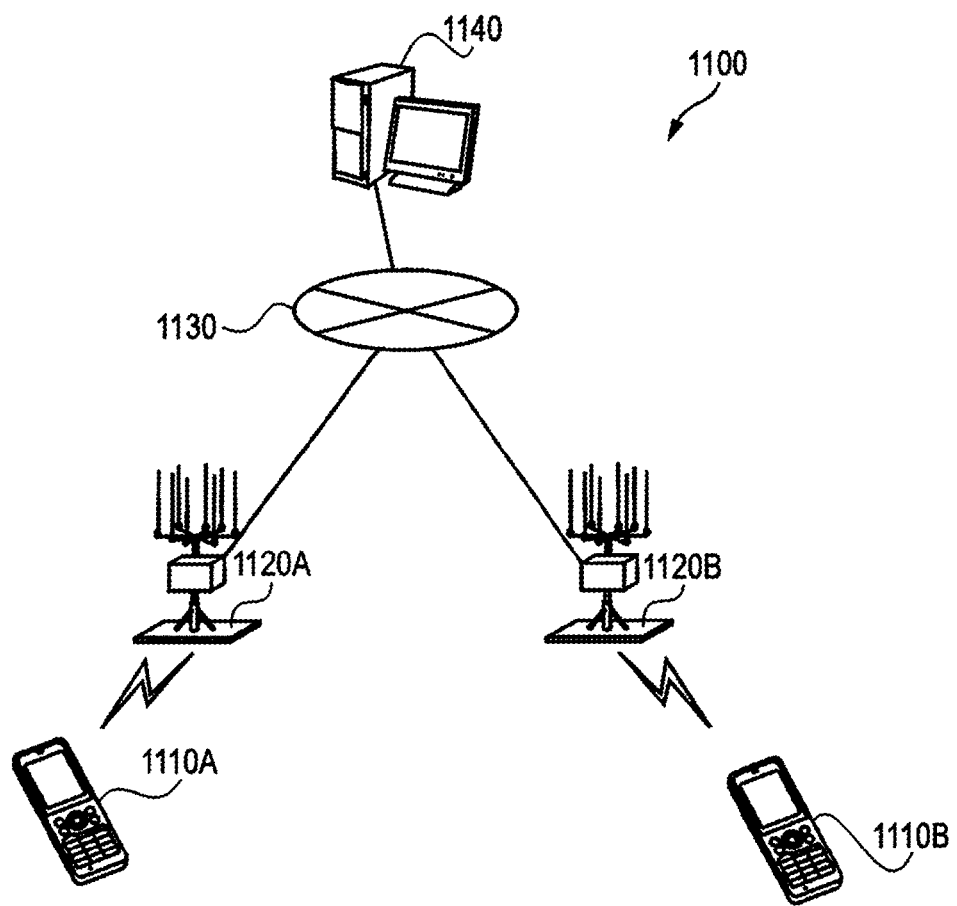
FIG. 5 is a schematic view showing a connection relation between components included in a wireless communication system.

FIG. 5 is a schematic view showing the connection relation between components included in a wireless communication system. Wireless communication system 1100 includes PHS terminals 1110 (1110A and 1110B), base stations 1120 (1120A and 1120B), a communication network 1130 including an ISDN (Integrated Service Digital Network), Internet, a private line and the like, and a relay server 1140.

In the wireless communication system 1100, when a user makes an access from his/her PHS terminal 1110A to the other PHS terminal 1110B through a communication line, the PHS terminal 1110A makes a request for wireless access to the base station 1120A which lies within coverage. Upon receiving the request for wireless access, the base station 1120A makes a request for communication access to a communication counterpart to the relay server 1140 through the communication network 1130. Then, the relay server 1140 selects, for example, the base station 1120B, which lies within the coverage of the PHS terminal 1110B, by referring to the position registration information of the PHS terminal 1110B, thereby securing a communication path between the base station 1120A and the base station 1120B to establish communication between the PHS terminal 1110A and the PHS terminal 1110B.

In such a wireless communication system 1100, various techniques have been employed for improving communication speed and communication quality of the PHS terminals 1110 and the base stations 1120. In the second exemplary embodiment, for example, the next generation PHS communication technique such as ARIB STD T95 or PHS MoU is employed and wireless communication based on an OFDMA/TDMA-TDD system is conducted between the PHS terminals 1110 and the base stations 1120. In this embodiment, improvement of communication stability is planned by assigning an anchor channel, which transmits control information such as MCS (Modulation and Coding Scheme), a communication channel map, error information and the like in such wireless communications, to a PRU of a predetermined frequency domain. Hereinafter, detailed configuration of the base stations 1120 in such a wireless communication system 1100 will be described.

(Base Station 1120)

Figure 6:
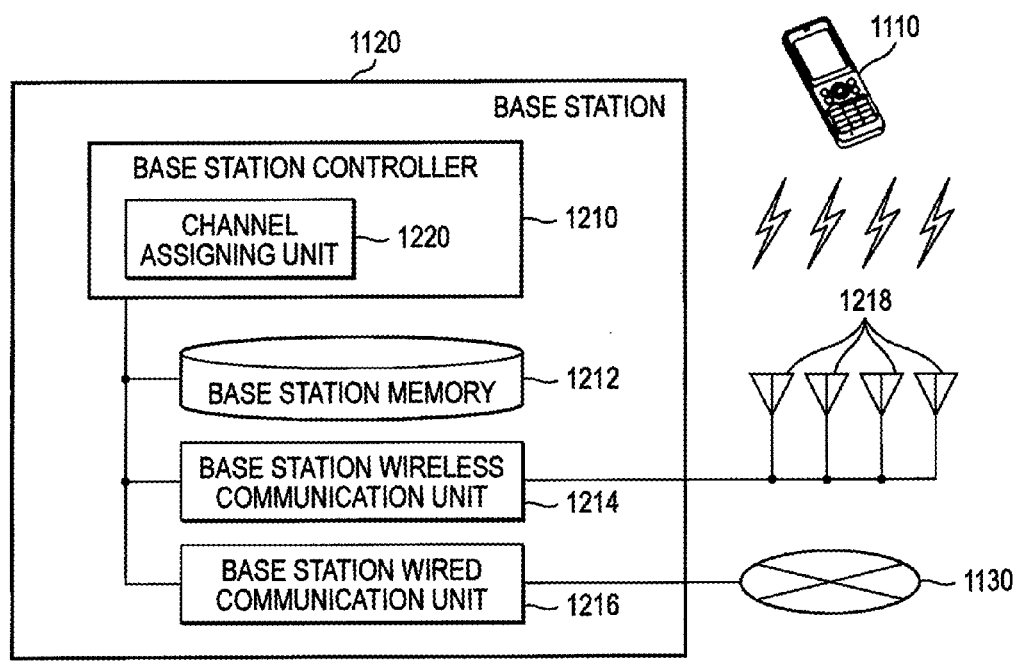
FIG. 6 is a block diagram showing a general configuration of a base station.

FIG. 6 is a block diagram showing a general configuration of a base station. A base station 1120 includes a base station controller 1210, a base station memory 1212, a base station wireless communication unit 1214 and a base station wired communication unit 1216.

The base station controller 1210 manages and controls the base station 1120 as a whole by means of a semiconductor integrated circuit including a central processing unit (CPU). In addition, the base station controller 1210 controls a communication access to the communication network 1130 of the PHS terminal 1110 or other PHS terminals 1110 using a program of the base station memory 1212. The base station memory 1212 is constituted by ROM, RAM, EEPROM, non-volatile RAM, flash memory, HDD or the like, and stores programs processed in the base station controller 1210, time information, etc.

The base station wireless communication unit 1214 arrays signals received from the antennas 1218 to establish communication with the PHS terminal 1110 and exchange data with the PHS terminal 1110.

In this embodiment, the antennas 1218 have an adaptive array function and can dynamically change directionality of electric waves to be transmitted/received by beam forming and null steering. Here, the beam forming increases the electric waves strength by adjusting phases of the electric waves output from the plurality of antennas 1218, and the electric wave strength is weakened as positions of the null steering are cancelled each other by deviating phases of the electric waves from each other.

The base station wired communication unit 1216 may access various servers including the relay server 1140 through the communication network 1130.

In addition, in this embodiment, the base station controller 1210 also acts as a channel assigning unit 1220.

The channel assigning unit 1220 assigns an anchor channel (hereinafter referred to as ANCH) related to a control signal and an extra channel (hereinafter referred to as EXCH), which stores data, to PRU (Physical Resource Unit) defined by an occupation band of 900 kHz according to a base band distance and the duration of 625 µsec by time division.

Figure 7:
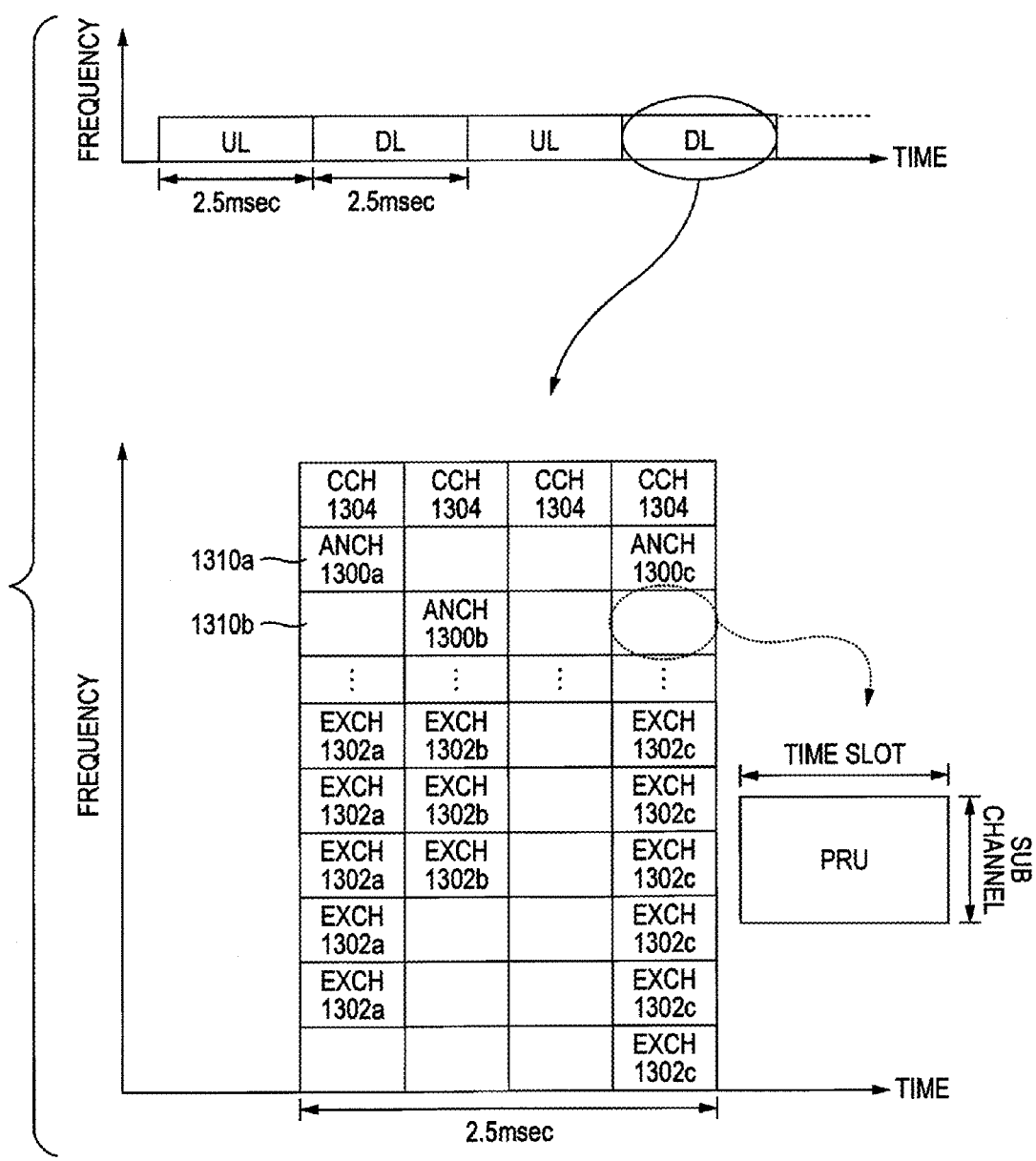
FIG. 7 is a view for explaining a frame structure according to a second exemplary embodiment of the invention.

FIG. 7 is a view for explaining a frame structure according to this embodiment. The OFDMA/TDMA system has a map two-dimensionalized in time axis and frequency axis directions. A plurality of sub channels are arranged in the frequency axis direction with a constant base band distance, and PRU is disposed for each time slot (TDMA slot) in each sub channel.

In this embodiment, ANCH 1300 is a control signal of FM-Mode and includes, for example, a map indicating assignment information of EXCH 1302, timing control bits, transmission output control bits, ACK bits informing whether or not there is a data arrival of HARQ (Hybrid Automatic Repeat reQuest), which is a kind of automatic retransmission request, etc.

ANCH 1300 is assigned to PRU having the least interference based on a result of carrier sense and one ANCH 1300 is fixedly assigned for one PHS terminal 1110.

EXCH 1302 is PRU assigned for each terminal device as a communication path in FM-Mode, and may be assigned in plural to one PHS terminal 1110.

Assignment of EXCH 1302 is performed through carrier sense to determine whether or not PRU is used by other users. The map of ANCH 1300 informs each terminal device (PHS terminal 1110) which PRU is assigned as EXCH 1302 to the predetermined PHS terminal 1110, and the PRU is dynamically assigned for each frame.

As shown in FIG. 7, the channel assigning unit 1220 may assign EXCH 1302a, which is used by the PHS terminal 1110 to which ANCH 1300a is assigned, to other PRUs of the same time slot as PRU to which ANCH 1300a is assigned.

Accordingly, EXCH 1302a of the PHS terminal 1110 using ANCH 1300a is assigned to PRU of the time slot to which ANCH 1300a is assigned. Accordingly, EXCH 1302 of the PHS terminal 1110 in which ANCHs 1300b and 1300c are assigned to other time slots is not assigned to PRU of the time slot to which ANCH 1300 is assigned.

In addition, the channel assigning unit 1220 assigns ANCH 1300 (ANCHs 1300a, 1300b and 1300c in FIG. 7) to PRUs of different time slots for each PHS terminal 1110.

With the configuration that ANCH 1300 is assigned to different time slots for each PHS terminal 1110, EXCH 1302 is assigned to different time slots for each PHS terminal 1110. Accordingly, one time slot is used by one PHS terminal 1110 and thus it becomes possible to prevent interference from EXCH 1302 of other PHS terminals 1110 with ANCH 1300.

In addition, since communication can be conducted by time division (for each time slot) for each PHS terminal 1110, it becomes possible to narrow an electric wave in a predetermined direction by forming a beam forming using the antennas 1218 having an adaptive array function and to prevent interference with other base stations 1120 to the minimum by forming a null steering.

That is, since a PHS terminal 1110 can be specified as a communication party at any moment, it becomes possible to form the beam forming in a direction of the specified PHS terminal 1110 and form the null steering in directions other than the direction of the specified PHS terminal 1110. This allows maximal use of the effect of the adaptive array function.

In addition, in this embodiment, the channel assigning unit 1220 assigns ANCH 1300 to PRU 1310a or PRU 1310b adjacent to or near the control channel 1304.

Since the control channel 1304 is intermittently used, there are many cases where PRUs arranged in one sub channel to which the control channel 1304 is arranged does not conduct communication. Accordingly, since PRU 1310a and PRU 1310b adjacent to or near the control channel 1304 have low interference, it becomes possible to avoid discontinuity of communication due to interference with ANCH 1300 by assigning ANCH 1300 to the corresponding PRU.

Figure 8A:
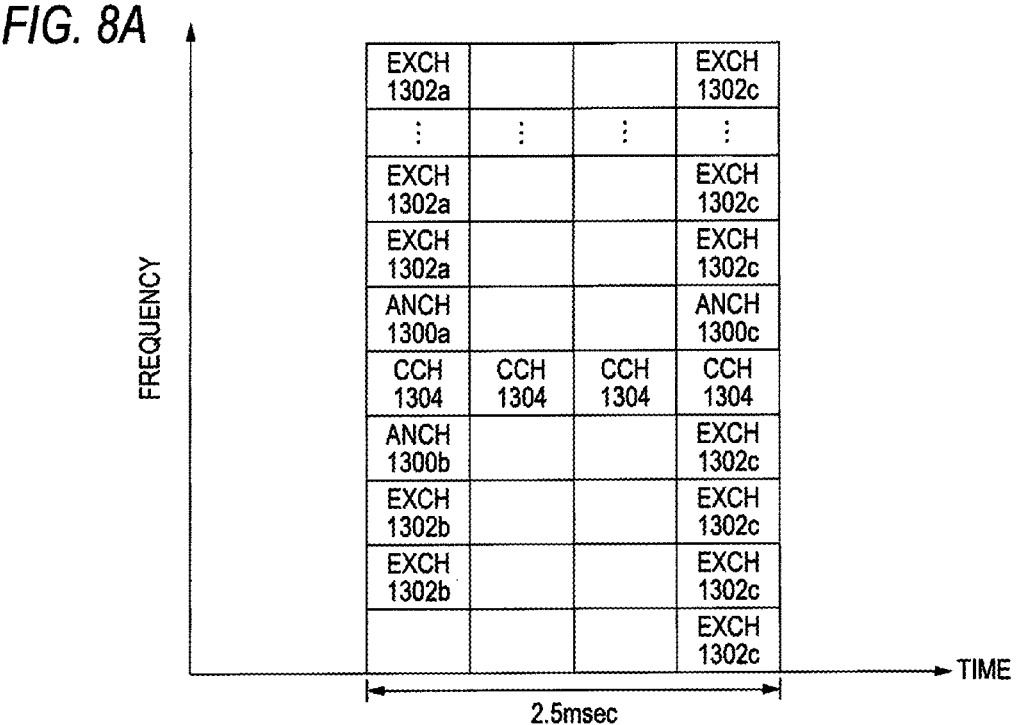
FIGS. 8A and 8B are views for explaining a different operation of a channel assigning unit.
Figure 8B:
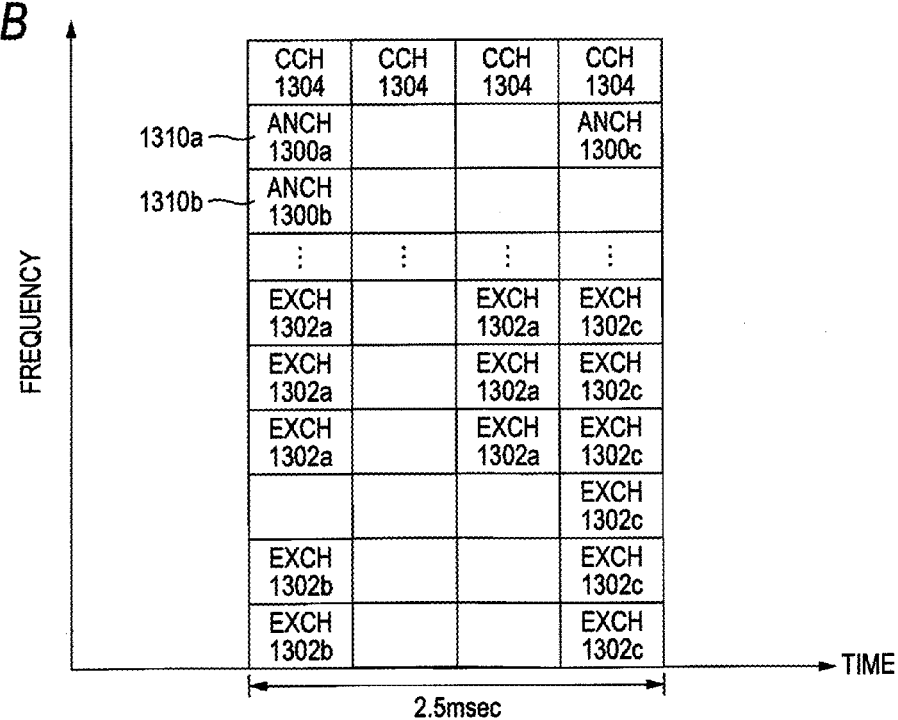

FIGS. 8A and 8B are views for explaining a different operation of the channel assigning unit, showing a case where the channel assigning unit assigns ANCHs, which are used by a plurality of PHS terminals, to the same time slot.

As shown in FIG. 8A, there is a case where the channel assigning unit 1220 assigns ANCH 1300a and 1300b, which are used by the plurality of PHS terminals 1110, to PRU of the same time slot based on a result of carrier sense. In this case, the channel assigning unit 1220 assigns EXCH 1302a, which is used by the PHS terminal 1110 to which ANCH 1300a is assigned, to PRU adjacent to ANCH 1300a. Likewise, the channel assigning unit 1220 assigns EXCH 1302b, which is used by the PHS terminal 1110 to which ANCH 1300b is assigned, to PRU adjacent to ANCH 1300b.

In this manner, when a plurality of ANCHs 1300 is assigned to the same time slot, if EXCH 1302a of the PHS terminal 1110 using ANCH 1300 is assigned to PRU adjacent to ANCH 1300, since adjacent PRUs have the same modulation scheme or electric wave strength, it becomes possible to suppress interference from EXCH 1302b of other PHS terminals 1110.

In addition, as shown in FIG. 8B, there is a case where ANCHs 1300a and 1300b used by the plurality of PHS terminals 1110 are assigned to PRU 1310b adjacent to PRU 1310a adjacent to the control channel 1304, as PRU of the same time slot. In this case, since ANCHs 1300 are intensively arranged in a region adjacent to the control channel 1304, it becomes possible to suppress interference from EXCH 1302 of other PHS terminals 1110.

At this time, if EXCH 1302 is to be assigned to the same time slot as ANCH 1300, EXCHs 1302a and 1302b for a plurality of PHS terminals 1110 are assigned to the same time slot. In this case, by providing unassigned PRU between EXCHs 1302a and 1302b used by the PHS terminals 1110, it becomes possible to avoid overlap of frequencies of electric waves and prevent interference therebetween.

In addition, in a case where the amount of data is large and EXCH 1302*a* is not all assigned to the same time slot as the time slot to which ANCH 1300*a* was assigned, EXCH 1302*a* may be assigned to PRU of a different time slot in which communication has not been conducted (see a third time slot in FIG. 8B). Even in this case, since EXCHs 1302 used by the same PHS terminal 1110 are arranged in the same time slot, communication can be conducted by time division (for each time slot) for each PHS terminal 1110. Accordingly, since electric waves can be narrowed in a predetermined direction using the antennas 1218 having the adaptive array function, it becomes possible to suppress interference with other base stations 1120 to the minimum.

In the above-described wireless communication system 1100, the base station 1120 assigns EXCH 1302*a* of the PHS terminal 1110 using ANCH 1300*a* to PRU of the time slot to which ANCH 1300*a* is assigned. This means that EXCHs 1302 of other PHS terminals 1110 are not assigned to PRU of the time slot to which ANCH 1300 is assigned. Accordingly, it becomes possible to prevent interference of EXCHs 1302 of other PHS terminals 1110 with ANCH 1300, which results in stable communication. Next, a wireless communication method of conducting wireless communication using the above-described base station 1120 will be described.

(Wireless Communication Method)

Figure 9:
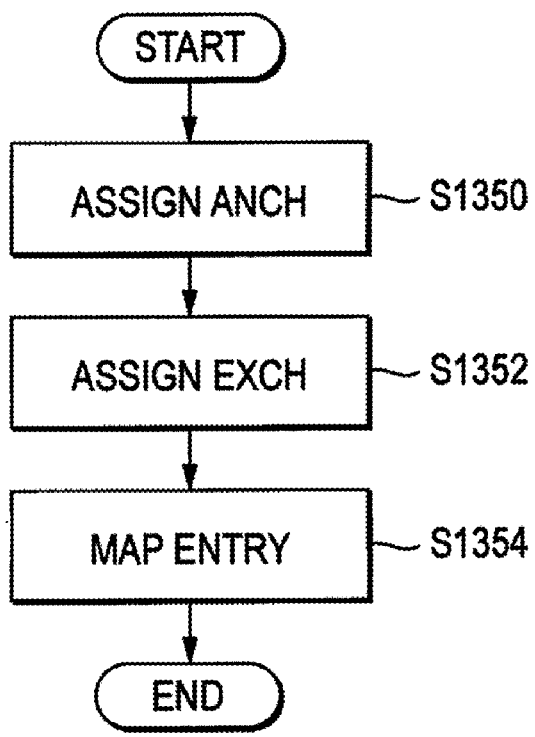
FIG. 9 is a flow chart showing a flow of process in a wireless communication method according to a second embodiment of the invention.

FIG. 9 is a flow chart showing a flow of process in a wireless communication method according to this embodiment.

The base station 1120 performs carrier sense and assigns ANCH 1300 to PRU adjacent to or near the control channel 1304 having low interference (S1350: ANCH assignment step). Next, carrier sense is performed to determine whether or not PRU is used by other users, and PRU in the same time slot as the time slot to which ANCH 1300 was assigned, in which communication has not been conducted, is assigned to EXCH 1302 (S1352: EXCH assignment step).

Subsequently, the position and number of PRUs of EXCH 1302 are entered as assignment information into a map of ANCH 1300 and are sent to each terminal device (PHS terminal 1110) (S1354: map entry step). The PHS terminal 1110 reads ANCH 1300 and conducts communication by acquiring EXCH 1302 according to the map included in the read ANCH 1300. Then, since interference with ANCH 1300 is extremely reduced, stable communication can be conducted.

While the second exemplary embodiment of the invention have been described with reference to the accompanying drawings, it goes without saying that the present invention is not limited to this embodiment. It is apparent to those skilled in the art that various modifications and changes can be made without departing from the spirit and scope of the invention set forth in the claims and it should be understood that such modifications and changes are included in the technical scope of the invention.

Steps in the wireless communication method of this disclosure are not necessarily be performed in time-series in an order described in the shown flow chart, but may be performed in parallel or by a sub routine.

The present invention is applicable for a base station and a wireless communication method which are capable of conducting wireless communications using an OFDMA system.

What is claimed is:

1. A base station that conducts wireless communication with one or more terminal devices using an OFDMA system, comprising:
    a channel assigning unit that assigns a physical resource unit (PRU) an extra channel used for data communication and an anchor channel including a map indicating the position of the PRU to which the extra channel is assigned,
    wherein the channel assigning unit assigns the anchor channel to a PRU of a predetermined frequency domain and assigns the extra channel to a PRU of a domain other than the predetermined frequency domain.

2. The base station according to claim 1,
    wherein the predetermined frequency domain is adjacent to a frequency domain to which a control channel is assigned.

3. The base station according to claim 1,
    wherein the predetermined frequency domain is biased to the highest or lowest frequency domain used by the base station.

4. A wireless communication method using one or more terminal devices and a base station using an OFDMA system,
    wherein, when the base station assigns a physical resource unit (PRU) an extra channel used for data communication and an anchor channel including a map indicating the position of the PRU to which the extra channel is assigned, the base station assigns the anchor channel to a PRU of a predetermined frequency domain and assigns the extra channel to a PRU of a domain other than the predetermined frequency domain to which the anchor channel is assigned.

5. A base station that conducts wireless communication with one or more terminal devices using an OFDMA system, comprising:
    a channel assigning unit that assigns a physical resource unit (PRU) an extra channel used for data communication and an anchor channel including a map indicating a position of the PRU to which the extra channel is assigned,
    wherein the channel assigning unit assigns the extra channel, which is used by the terminal device to which the anchor channel is assigned, to a different PRU of the same time slot as the PRU to which the anchor channel is assigned.

6. The base station according to claim 5,
    wherein, if the channel assigning unit assigns a plurality of anchor channels to the PRU of the same time slot, the channel assigning unit assigns the extra channel, which is used by the terminal device to which one anchor channel is assigned, to a PRU adjacent in a frequency direction of the one anchor channel.

7. A base station that conducts wireless communication with one or more terminal devices using an OFDMA system, comprising:
    a channel assigning unit that assigns a physical resource unit (PRU) an extra channel used for data communication and an anchor channel including a map indicating a position of the PRU to which the extra channel is assigned,
    wherein the channel assigning unit assigns the extra channel used by one terminal device to a PRU of one time slot.

8. The base station according to claim 7,
    wherein the channel assigning unit assigns the extra channel to a PRU of the same time slot as the anchor channel which is used by the terminal device to which the extra channel is assigned.

9. The base station according to claim 5,
    wherein the channel assigning unit assigns the anchor channel to a PRU of a different time slot for each terminal device.

10. The base station according to claim 5,
wherein the channel assigning unit assigns the anchor channel to a PRU adjacent to a control channel or next to the PRU adjacent to the control channel.

11. The base station according to claim 5, further comprising an adaptive array antenna.

12. A wireless communication method using one or more terminal devices and a base station using an OFDMA system, wherein, when the base station assigns a physical resource unit (PRU) an extra channel used for data communication and an anchor channel including a map indicating a position of the PRU to which the extra channel is assigned, the base station assigns the extra channel, which is used by the terminal device to which the anchor channel is assigned, to a different PRU of the same time slot as the PRU to which the anchor channel is assigned.

* * * * *